UNITED STATES PATENT OFFICE.

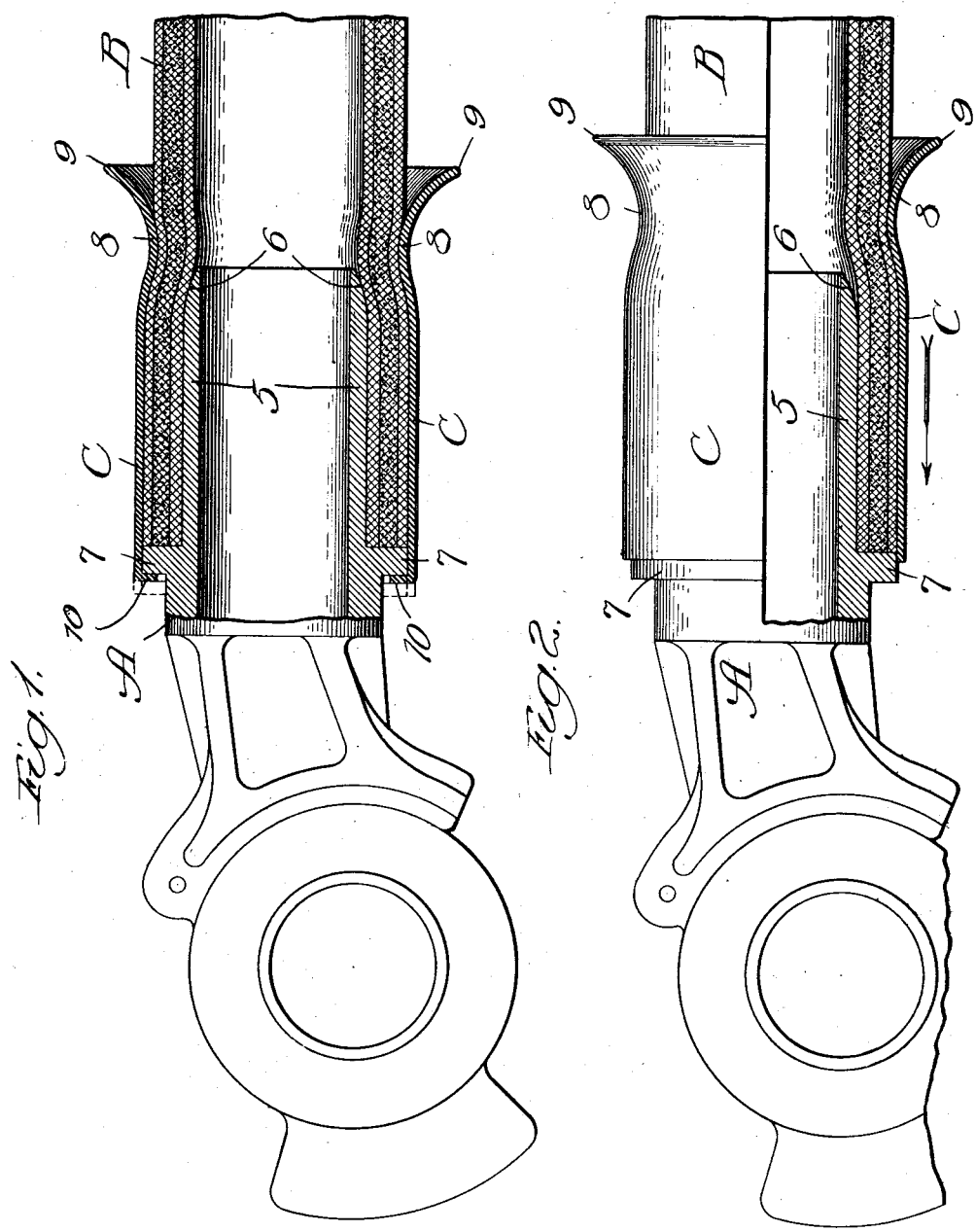

HERBERT H. HEWITT, OF BUFFALO, NEW YORK.

HOSE-COUPLING.

1,067,337. Specification of Letters Patent. Patented July 15, 1913.

Application filed February 3, 1913. Serial No. 745,993.

*To all whom it may concern:*

Be it known that I, HERBERT H. HEWITT, a citizen of the United States, and a resident of the city of Buffalo, county of Erie, and State of New York, have invented certain new and useful Improvements in Hose-Couplings, of which I do declare the following to be a full, clear, and exact description, reference being had to the accompanying drawing, forming part of this specification.

The present invention, while susceptible of more extended use, is especially designed to provide an improved construction of hose coupling particularly well adapted for securing the sections of air brake hose and steam pipe hose, used on railway cars and engines, to the couplings or nipples to which the sections of hose are attached.

The invention consists in the features of improvement hereinafter described, illustrated in the accompanying drawing and particularly pointed out in the claims at the end of this specification.

In the accompanying drawing, Figure 1 is a view partly in elevation and partly in central, longitudinal section through a hose coupling embodying my invention. Fig. 2 is a view similar to Fig. 1, but showing the retaining sleeve somewhat in advance of the position which it will occupy just before it is moved to clamp the hose against the shank of the coupling.

While in the drawing I have shown my improved coupling as applied to one of the coupling members by which the sections of hose in a train pipe system will be united together, it will be understood, of course, that the invention is equally applicable to the nipples whereby the sections of hose are connected to the train pipe, or, indeed, to other types of hose coupling members.

Hose couplings have heretofore been devised, (as shown in application Serial No. 717,815, filed by C. H. Paeplow, Jr., and myself, August 29, 1912) in which the end of the hose section is united to a coupling member that has a reduced shank entering the end of the hose, the hose being held upon the shank by an encircling sleeve that is drawn to a definite and predetermined position by means of a retaining nut. Such prior construction of hose coupling, while advantageous in many respects, is defective, for the reason that no provision is made for regulating the degree of pressure or grip exerted by the retaining sleeve on the hose to force the latter against the end portion of the shank of the coupling or nipple.

In practice, the walls of rubber hose sections vary, more or less, in thickness, and vary also in the degree of hardness incident to the material used in the manufacture of the hose, the vulcanization, and other causes. The result is, that a hose coupling,—such, for example, as that above described,—which is adapted to exert a uniform and predetermined pressure when the retaining sleeve is forced to its final position for use, is not suited to take care of the variations in thickness or hardness of the hose sections.

By my present invention I provide a hose coupling in which the retaining sleeve may be forced to clamp the hose section against the end portion of the coupling shank with a degree of pressure proportionate to the exact thickness of the wall of the hose section and its hardness; so that the clamping of the hose between the sleeve and the shank of the coupling shall not be too excessive, nor yet so slight as to permit the leakage of air or steam around the end of the shank and between the surface of the shank and the interior surface of the hose.

In practice, with prior constructions I have found that the shanks on the couplings and nipples of air brake hose couplings, and, as well also, steam heat hose couplings, corrode very rapidly, thereby rendering them rough to such extent as to injure the inner tube of the hose when it is mounted or pressed on to the shank. This corrosion is caused either by the compressed air, which contains a high percentage of moisture, or by the steam forcing itself in between the free end of the shank and the hose, and the moisture contained in the air or steam leaching the sulfur out of the rubber of which the inner tube of the hose is composed, which sulfur then attacks the iron, causing it to corrode very rapidly.

By my present invention, provision is made for holding or confining the hose closely at the free end of the shank, so that air or steam is excluded from between the outer surface of the shank and the inner surface of the hose up to the shoulder against which the end of the hose abuts. The result of this exclusion of air or steam is not only the prevention of the corrosion of the shank of the coupling, but also a far tighter grip of the hose upon the shank is insured, so that correspondingly less pressure is required to retain the hose on the shank. The reason why such less pressure is required to retain the hose on the shank when air or steam is excluded from between the shank and the hose is, that if air or steam be permitted to enter between the shank and the hose, such air or steam acts as a lubricant, thereby rendering it much more difficult to firmly secure the hose to the shank in such manner as to prevent its being withdrawn therefrom.

In carrying out my invention, I prefer to follow the details of construction hereinafter described and illustrated in the accompanying drawing, although it will be manifest that these precise details may be varied without departing from the scope of the invention.

From the body A of the coupling projects a shank 5 that is adapted to enter the end of the hose section B. The exterior diameter of this shank 5 is uniform from its inner end to a point adjacent its outer or free end, at which point it is curved, as shown at 6, to enable the shank to be readily inserted within the hose and to prevent the end of the shank from chafing or cutting the inner tube of the hose. At the inner end of the shank 5, the body A of the coupling is formed with an annular shoulder 7, and over this shoulder 7 fits the inner end of a retaining sleeve C. The sleeve C is formed of sheet metal, and, as shown, its interior diameter is uniform from its inner end, that sets over the shoulder 7, to a point adjacent its outer end, at which point the sleeve is formed with an annularly contracted portion 8. The free end of the sleeve C is formed with a bell-mouth 9, so that all danger of the end of the sleeve chafing or cutting the hose is avoided. The exterior surface of the shank 5, including its curved end portion 6, should be smoothly turned so as to avoid all danger of chafing or injuring the inner tube of the hose as it is pushed on to the shank. The sleeve C is movable freely in straight axial direction over the annular shoulder 7 of the coupling.

In securing the hose to the coupling, the sleeve C is first slipped over the end of the hose to the extent shown in Fig. 2 of the drawing, or even a trifle farther. The shank 5 is then inserted into the end of the hose until the shoulder 7 bears against the end of the hose B. The parts will then be in substantially the position shown in Fig. 2 of the drawing. Pressure will then be exerted upon the flared end 9 of the sleeve C and the sleeve itself will be forced in the direction of the arrow, Fig. 2, until the annularly contracted portion 8 of the sleeve firmly presses or binds the wall of the hose against the curved portion 6 of the end of the shank. The degree of pressure exerted upon the sleeve C, forcing it in the direction of the arrow (Fig. 2), will be the exact degree of pressure required to properly grip or compress the hose against the curved portion of the end of the shank 5, so as to prevent all danger of air or steam being forced over the rounded surface 6 of the shank and between the exterior of the shank and the inner wall of the hose. The pressure exerted upon the sleeve C to force it into position for properly gripping the hose between the curved portion 6 of the shank 5 and the inwardly contracted portion 8 of the sleeve, and the exact extent to which the sleeve C will be moved in the direction of the arrow, Fig. 2, will depend upon the thickness and hardness of the hose.

After the sleeve C has been moved from the position shown in Fig. 2 to the position shown in Fig. 1, at which time it will properly grip the hose between the contracted portion 8 of the sleeve and the rounded surface 6 of the shank, the inner end of the sleeve will be bent so as to suitably interlock with the annular shoulder 7, in order to prevent any possibility of the accidental removal of the sleeve from the body of the coupling. Preferably, the interlocking of the sleeve with the annular shoulder 7 is effected by crimping or flanging the end 10 of the sleeve around the annular shoulder 7, as indicated in Fig. 1 of the drawing. Inasmuch as the inward movement of the sleeve C over the shoulder 7 is free and unobstructed, it will be seen that the sleeve can be positively locked in different positions, with respect to the shank, against outward movement after the sleeve has been forced inward to whatever extent may be required by the particular thickness and character of the hose that is applied to the coupling. Obviously, the farther the sleeve C is pushed in the direction of the arrow, Fig. 2, the more the walls of the hose are compressed between the contracted portion of the sleeve and the end of the shank, and the more securely will the hose be gripped; hence, regardless of any variations in the thickness of the walls of the hose or their density, the proper gripping of the hose between the contracted portion 8 of the sleeve and the rounded surface 6 of the shank can always be effected. The removal of the hose and sleeve from the shank can be readily accomplished either by slitting the sleeve lengthwise and pulling it apart, or by cutting off the flanged outer end of the sleeve which interlocks with the shoulder 7; but the sleeves are of inexpensive material, while the couplings or nipples may be used over and over again with new sleeves.

Having thus described my invention, what I claim as new, and desire to secure by Letters Patent, is:—

1. A hose coupling comprising a metal body having a rigid shank adapted to enter the end of the hose and an exterior shoulder at the inner end of said shank, and a retaining sleeve encircling said shank with the hose thereon, said sleeve being longer than said shank and provided with an annularly contracted portion adjacent its outer end, said sleeve having an unobstructed sliding movement in straight axial direction inwardly over said shoulder to thereby compress the hose between said annularly contracted portion and the outer end of said rigid shank, and means for positively locking said sleeve in different positions with respect to said shank, against outward movement after the sleeve has been forced inwardly to the extent necessary to form a tight joint between the hose and the outer end of said shank, substantially as described.

2. A hose coupling comprising a metal body having a rigid shank adapted to enter the end of the hose and an exterior cylindrical shoulder at the inner end of said shank and a retaining sleeve of relatively thin ductile metal for encircling said shank with the hose thereon, said sleeve being longer than said shank and provided with an annularly contracted portion forming an internal rib adjacent its outer end, said sleeve having an unobstructed sliding movement in straight line direction inwardly over said shoulder to thereby compress the hose between said rib and the outer end of said rigid shank, the inner end of said sleeve being adapted to be bent or crimped into engagement with said shoulder to thereby lock said sleeve in different positions with said shank, against outward movement after the sleeve has been forced inwardly to the extent necessary to form a tight joint between the hose and the outer end of said rigid shank.

3. A hose coupling comprising a metal body having a substantial cylindrical, rigid shank provided with a convexly rounded outer end, said body having an exterior, cylindrical shoulder at the inner end of said shank and a substantial cylindrical retaining sleeve of relatively thin ductile metal adapted to encircle said shank with the hose thereon, said sleeve being longer than said shank and provided with an annularly contracted portion adjacent its outer end terminating in an outwardly flaring bell, said contracted portion forming an internal rib having an inner, convexly rounded surface and said sleeve having an unobstructed sliding movement in straight axial direction inwardly over said shoulder to thereby compress the hose between said rib and the convexly rounded outer end of said rigid shank, the inner end of said sleeve being adapted to be bent or crimped into engagement with said shoulder to thereby lock said sleeve against outward movement and in different positions with respect to said shank, after said sleeve has been forced inwardly to the extent necessary to form a tight joint between the hose and the outer end of said shank, substantially as described.

HERBERT H. HEWITT.

Witnesses:
 EUGENE J. COLEMAN,
 GEORGE D. PLUMSTEAD.